Dec. 27, 1949     J. H. STARK     2,492,770
BRUSH HOLDER ASSEMBLY
Filed Sept. 23, 1948
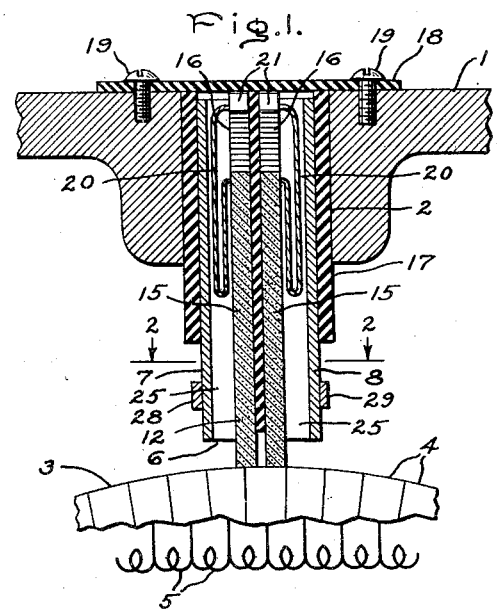
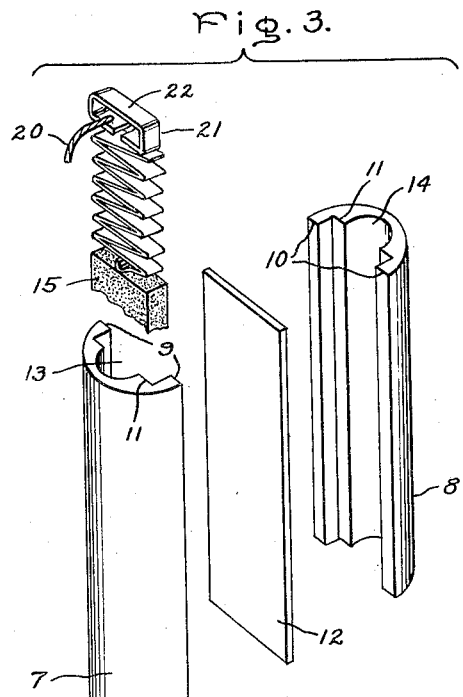
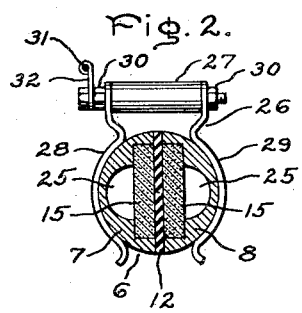
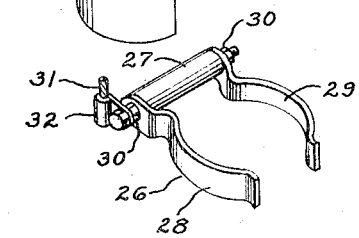
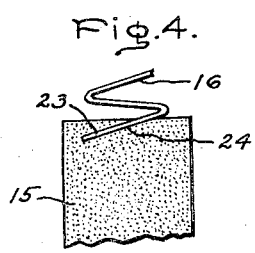
Inventor:
Julian H. Stark,
by Pravell F. Mack
His Attorney.

Patented Dec. 27, 1949

2,492,770

UNITED STATES PATENT OFFICE 2,492,770

BRUSH HOLDER ASSEMBLY

Julian H. Stark, Fort Wayne, Ind., assignor to General Electric Company, a corporation of New York Application September 23, 1948, Serial No. 50,862

10 Claims. (Cl. 171—323)

This invention relates to brush holder assemblies for commutator type dynamoelectric machines and more particularly to such an assembly which is adapted to accommodate a contact brush having two electrically insulated segments.

In application Serial No. 15,782 of Charles A. Thomas, filed March 19, 1948, and assigned to the assignee of the present application, there is disclosed a contact brush for a commutating type dynamoelectric machine having two segments electrically insulated from each other with the leading segment connected directly in the circuit of the dynamoelectric machine and the trailing segment connected to the first segment through a series resistor. This arrangement utilizes the voltage drop in the resistor responsive to the flow of load current in its associated brush segment to neutralize substantially the reactive voltage of the armature coil undergoing commutation so that the reversal of current in each armature coil as it passes from one side of the brush to the other is facilitated and sparking reduced. This invention contemplates an improved brush holder assembly for utilizing the split brush and resistor arrangement described in the above-mentioned application Serial No. 15,782.

An object of this invention is to provide an improved brush holder assembly for commutating type dynamoelectric machines.

Another object of this invention is to provide an improved brush holder assembly for accommodating a two-segment brush.

Further objects and advantages of this invention will be better understood from the following description referring to the accompanying drawing. The features of novelty which characterize this invention will be pointed out with particularity in the claims annexed to and forming a part of this specification.

In the drawing, Fig. 1 is a side elevational view, partly in section, illustrating the improved brush holder assembly of this invention; Fig. 2 is a cross-sectional view of the brush holder assembly of Fig. 1 taken along the line 2—2; Fig. 3 is an exploded view illustrating in perspective the various components of this improved brush holder assembly; and Fig. 4 illustrates the brush and spring assembly of this invention when brushes without pigtails are utilized.

In accordance with this invention, there is provided a brush holder tube having two longitudinal half-sections formed of conductive material with their opposed surfaces each having a longitudinal groove formed therein. A sheet of insulating material is positioned between the opposed surfaces of the two sections, electrically insulating them from each other and defining with the longitudinal grooves two parallel longitudinal brush-receiving slots. A sleeve of resilient insulating material, such as rubber or neoprene, is positioned around the assembled brush holder tube comprising the two half sections and the interspaced insulating strip, and the resultant assembly is positioned in an opening in the stationary frame of a commutating type dynamoelectric machine. A contact brush segment is positioned in each slot and these segments are biased toward a current collector surface by springs respectively positioned in each slot. The brush segments are connected to the circuit of the machine by a spring clip member comprising a resistor with a spring clip portion secured at each end. These clip portions respectively embrace the two brush holder tube sections and the brush lead is connected to either one end or the other end of the resistor depending upon the direction of rotation of the machine.

Referring now to Fig. 1, there is shown a portion of the stationary frame 1 of a commutating type dynamoelectric machine having a brush tube-receiving opening 2 formed therein. This machine is provided with a commutator 3 having a plurality of segments or bars 4 to which the armature coils, shown schematically as 5, are connected. The load current flowing in each of the armature coils 5 must necessarily reverse itself as the coil passes from one side of the brush to the other during commutation. In ideal commutation the current in each coil should decrease at a uniform rate and reach a zero value at a point corresponding to the middle of the brush. The current should then increase at a uniform rate and reach its normal value at the opposite direction by the time the coil passes from under the brush. However, this ideal commutation is ordinarily not obtainable due to the fact that each armature coil, being imbedded in slots in the iron of the armature core, has considerable inductance. Therefore, the coil undergoing commutation has induced in it a voltage of self-induction or a reactive voltage due to the changing current in the coil. This reactive voltage is also in a direction to oppose the change of current in the coil and thus proper commutation will not be secured and sparking may result since the current in the coil may not have reached the correct value by the time the coil passes from under the brush. It is, therefore, desirable in commutating type dynamoelectric machines to provide a voltage in the coil undergoing commutation which is opposed to and which will neutralize substantially the reactive voltage during commutation thus insuring that the current in the coil has reached the correct value when the coil leaves the brush. Numerous means have been provided for producing this neutralizing voltage including brush shifting arrangements, commutating poles, or compensating windings. The aforesaid application Serial No. 15,782 disclosed an improved arrangement for neutralizing this reactance voltage utilizing two electrically insulated brush segments with one segment connected directly in the circuit of the machine and the other segment arranged in series with a resistor.

In order to utilize this improved reactive voltage neutralizing scheme in commutating type dynamoelectric machines, particularly of fractional horsepower frame sizes, the arrangement now to be described is provided. Referring to Figs. 2 and 3, the dynamoelectric machine of Fig. 1 is provided with a brush holder tube 6 having two mating longitudinal half sections 7 and 8 formed of conductive material. The opposing surfaces 9 and 10 of the half sections 7 and 8 are each provided with a longitudinal groove 11 cut or otherwise formed therein. In manufacture, these brush tube half sections can be cut off from extruded stock, or a conventional cartridge brush holder tube can be merely cut in half to provide the two half sections. A relatively thin sheet of insulating material 12 is positioned between the opposing surfaces 9 and 10 of the half sections 7 and 8 and serves to electrically insulate the half sections from each other. In the assembled position, the insulating sheet 12 defines with the two longitudinal grooves 11, two parallel longitudinal brush-receiving slots 13 and 14. A pair of brush segments 15, formed of any desired conductive material, are positioned respectively in the brush slots 13 and 14 and are adapted for longitudinal movement therein. The brush segments 15 are resiliently biased into contact with the surface of the commutator 3 by springs 16 respectively positioned in the slots 13 and 14. The springs 16 are preferably of the ribbon compression type since this permits the use of brushes having much greater usable length. However, it will be understood that any conventional type of spring may be utilized.

The brush holder tube comprising the half sections 7 and 8 and the interspaced insulating strip 12 is inserted in a resilient insulating sleeve 17, formed of any convenient material such as rubber or neoprene, which in turn is positioned in the opening 2 of the stationary frame member 1. A cap member 18 formed of insulating material is secured to the stationary frame member 1 in any convenient manner, as by screws 19, and serves as a closure for the brush slots 13 and 14 at their ends remote from the commutator 3. Contact members 21 formed of conductive material are arranged in engagement with the upper extremity of the springs 16 and the cap member 18. The contact members 21 are formed to have a snug fit in the brush slots 13 and 14, thus assuring good electrical contact through the brushes 15 and the springs 16 to the brush holder tube segments 7 and 8. This snug fit is obtained by forming the clips 21 so that their top portions 22 are slightly longer than the bottom portions, thus providing a wedging action. In the event that the brush segments 15 are provided with pigtails 20, they are fastened to the contact members 21, as shown in Fig. 1. However, if the brush segments 15 are not provided with pigtails, the ends 23 of the springs 16 are inserted in slots 24 at the upper extremity of the brushes, as shown in Fig. 4, in order to provide good electrical contact from the brushes to the springs. Grooves 25 may be provided in the brush holder tube half sections 7 and 8 to accommodate the pigtails 20.

In order to provide for the connection of the leading brush segment in the circuit of the dynamoelectric machine and to connect the trailing segment through a resistor to the leading segment, a spring clip member 26 is provided comprising a resistor 27 and spring clip portions 28 and 29 respectively secured to the ends of the resistor 27 in any convenient manner, as by nuts 30. The spring clip portions 28 and 29 of the spring clip member 26 respectively embrace the brush holder tube half sections 7 and 8 intermediate the insulating sleeve 17 and the commutator end of the brush holder tube assembly. The lead 31 to the machine can then be connected at either end of the resistor 27, depending upon the direction of machine rotation desired, in any convenient manner as by a terminal 32.

It will now be readily apparent that this invention provides a practical and inexpensive brush holder assembly for accommodating insulated split brushes and for connecting the leading brush segment directly in the circuit of the dynamoelectric machine and the trailing segment to the leading segment through a resistor.

Further objects and advantages of this invention will be better understood from the following description referring to the accompanying drawing. The features of novelty which characterize this invention will be pointed out with particularity in the claims annexed to and forming a part of this specification.

What I claim as new and desire to secure by Letters Patent of the United States is:

1. A brush holder assembly comprising a brush holder tube having two longitudinal segments formed of conductive material with the opposed surfaces of said segments each having a longitudinal groove formed therein, a sheet of insulating material positioned between said opposed surfaces of said segments for electrically insulating said segments from each other, said sheet defining with said grooves two parallel longitudinal brush-receiving slots, a brush positioned in each of said slots and adapted for longitudinal movement therein, and a spring positioned in each of said slots for respectively urging said brushes against a current collector surface.

2. A brush holder assembly adapted to be mounted in an opening in a stationary frame, said assembly comprising a brush holder tube having tow longitudinal segments formed of conducting material with the opposed surfaces of said segments each having a longitudinal groove formed therein, a sheet of insulating material positioned between said opposed surfaces of said segments for electrically insulating said segments from each other, said sheet defining with said grooves two parallel longitudinal brush-receiving slots, a brush positioned in each of said slots and adapted for longitudinal movement therein, a spring positioned in each of said slots for respectively urging said brushes against a current collector surface, and a sleeve of insulating material surrounding said brush holder tube for insulating said brush holder tube segments from said frame.

3. A brush holder assembly adapted to be mounted in an opening in a stationary frame, said assembly comprising a brush holder tube having two longitudinal segments formed of conducting material with the opposed surfaces of said segments each having a longitudinal groove formed therein, a sheet of insulating material positioned between said opposed surfaces of said segments for electrically insulating said segments from each other, said sheet defining with said grooves two parallel longitudinal brush-receiving slots, a brush positioned in each of said slots and adapted for longitudinal movement therein, a spring positioned in each of said slots for respectively urging said brushes against a current collector surface, a sleeve of insulating material surrounding said brush holder tube for insulating said brush holder tube segments from said frame, and an insulating cap member secured to said frame for closing the ends of said slots remote from said current collector, said springs being held in compression between said cap member and said brushes.

4. A brush holder assembly for a dynamoelectric machine, said assembly comprising a brush holder tube having two longitudinal segments formed of conductive material with the opposed surfaces of said segments each having a longitudinal groove formed therein, a sheet of insulating material positioned between said opposed surfaces of said segments for electrically insulating said segments from each other, said sheet defining with said grooves two parallel longitudinal brush-receiving slots, a brush in each of said slots and adapted for longitudinal movement therein, a spring in each of said slots for respectively urging said brushes against a current collector surface of said dynamoelectric machine, and means having portions respectively engaging each of said segments for connecting said segments in the circuit of said dynamoelectric machine.

5. A brush holder assembly for a dynamoelectric machine, said assembly comprising a brush holder tube having two longitudinal segments formed of conductive material with the opposed surfaces of said segments each having a longitudinal groove formed therein, a sheet of insulating material positioned between said opposed surfaces of said segments for electrically insulating said segments from each other, said sheet defining with said grooves two parallel longitudinal brush-receiving slots, a brush in each of said slots and adapted for longitudinal movement therein, a spring in each of said slots for respectively urging said brushes against a current collector surface of said dynamoelectric machine, and a spring clip having two sections respectively embracing said brush holder tube segments for connecting said segments in the circuit of said dynamoelectric machine.

6. A brush holder assembly for a dynamoelectric machine, said assembly comprising a brush holder tube having two longitudinal segments formed of conductive material with the opposed surfaces of said segments each having a longitudinal groove formed therein, a sheet of insulating material positioned between said opposed surfaces of said segments for electrically insulating said segments from each other, said sheet defining with said grooves two parallel longitudinal brush-receiving slots, a brush in each of said slots and adapted for longitudinal movement therein, a spring in each of said slots for respectively urging said brushes against a current collector surface of said dynamoelectric machine, and a spring clip having two sections respectively embracing said brush holder tube segments and a resistor interposed between said spring clip sections, said spring clip being adapted to have one of said sections connected in the circuit of said dynamoelectric machine.

7. A brush holder assembly for a dynamoelectric machine, said assembly comprising a brush holder tube having two longitudinal segments formed of conductive material with the opposed surfaces of said segments each having a longitudinal groove formed therein, a sheet of insulating material positioned between said opposed surfaces of said segments for electrically insulating said segments from each other, said sheet defining with said grooves two parallel longitudinal brush-receiving slots, a brush in each of said slots and adapted for longitudinal movement therein, a spring in each of said slots for respectively urging said brushes against a current collector surface of said dynamoelectric machine, and a spring clip member comprising a resistor and two resilient clip portions formed of conductive material respectively secured to the ends of said resistor, said clip portions respectively embracing said brush holder tube segments, said spring clip member being adapted to have one of said clip portions connected in the circuit of said dynamoelectric machine.

8. A brush holder assembly adapted to be mounted in an opening in a stationary frame of a dynamoelectric machine, said assembly comprising a brush holder tube having two longitudinal segments formed of conducting material with the opposed surfaces of said segments each having a longitudinal groove formed therein, a sheet of insulating material positioned between said opposed surfaces of said segments for electrically insulating said segments from each other, said sheet defining with said grooves two parallel longitudinal brush-receiving slots, a brush positioned in each of said slots and adapted for longitudinal movement therein, a spring positioned in each of said slots for respectively urging said brushes against a current collector surface of said dynamoelectric machine, a sleeve of insulating material surrounding a portion of said brush holder tube remote from its current collector end for insulating said brush holder tube segments from said frame, and a spring clip member comprising a resistor and two resilient clip portions formed of conductive material secured to the ends of said resistor, said clip portions respectively embracing said brush holder tube segments intermediate said insulating sleeve and said current collector, said clip member being adapted to have one of said clip portions connected in the circuit of said dynamoelectric machine.

9. A brush holder assembly for electrical apparatus comprising a brush holder tube having two longitudinal segments formed of conducting material with the opposed surfaces of said segments having longitudinal grooves formed therein, a strip of insulating material positioned between said opposed surfaces for insulating said segments from each other, said strip defining with said grooves two parallel longitudinal brush-receiving slots, a brush positioned in each of said slots and adapted for longitudinal movement therein, and resilient means for respectively urging said brushes into contact with a part of said electrical apparatus.

10. A brush holder assembly for a dynamoelectric machine comprising a brush holder tube having two longitudinal half-sections formed of conductive material with the opposed surfaces of said sections having longitudinal grooves therein, a strip of insulating material positioned between said opposed surfaces for insulating said sections from each other, said strip defining with said grooves two parallel longitudinal slots, a brush positioned in each of said slots and adapted for longitudinal movement therein, and resilient means for respectively urging each of said brushes against a current collector surface of said dynamoelectric machine.

JULIAN H. STARK.

REFERENCES CITED

The following references are of record in the file of this patent:

UNITED STATES PATENTS

| Number | Name | Date |
|---|---|---|
| 1,059,134 | Fornander | Apr. 15, 1913 |
| 1,743,682 | Oswald | Jan. 14, 1930 |

FOREIGN PATENTS

| Number | Country | Date |
|---|---|---|
| 515,809 | France | Nov. 29, 1920 |

Certificate of Correction

Patent No. 2,492,770 December 27, 1949

JULIAN H. STARK

It is hereby certified that error appears in the printed specification of the above numbered patent requiring correction as follows:

Column 4, line 56, for "tow" read *two*;

and that the said Letters Patent should be read with this correction therein that the same may conform to the record of the case in the Patent Office.

Signed and sealed this 23rd day of May, A. D. 1950.

[SEAL]

THOMAS F. MURPHY,
*Assistant Commissioner of Patents.*